United States Patent [19]
Houston et al.

[11] Patent Number: 6,081,689
[45] Date of Patent: Jun. 27, 2000

[54] ARTIST'S MARKING MATERIAL

[75] Inventors: Robert D. Houston, Bernalillo County, N. Mex.; Joseph D'uva, Jr., New Port Richey, Fla.

[73] Assignee: D'uva Fine Artists Materials, Inc., Albuquerque, N. Mex.

[21] Appl. No.: 09/340,948

[22] Filed: Jun. 28, 1999

[51] Int. Cl.[7] .......................... C09D 11/12; G03G 21/00
[52] U.S. Cl. ........................................ 399/411; 106/31.01
[58] Field of Search .................... 399/1, 411; 106/31.01, 106/31.07; 101/488

[56] References Cited

U.S. PATENT DOCUMENTS

| | | |
|---|---|---|
| 3,924,566 | 12/1975 | Dennie . |
| 4,052,298 | 10/1977 | Bradley . |
| 4,193,906 | 3/1980 | Hatanaka ............................... 260/31.2 |
| 5,136,338 | 8/1992 | Greenaway . |

OTHER PUBLICATIONS

Superior Tusche Washes Using Dry Copier Toners, Nick Semenoff, Leonardo, vol. 20, No. 1, pp. 71–77, 1987.

*Primary Examiner*—Richard Moses
*Attorney, Agent, or Firm*—DeWitt M. Morgan

[57] ABSTRACT

A method of producing and using an artists chalk from dry copier toner is disclosed. The method includes the steps of providing a holder having a cavity for holding the toner, the cavity having a shape which, at least approximately, defines the shape of the finished chalk; and heating the toner at a temperature high enough and for a period long enough to sinter the toner into a chalk. Pressure is not applied to the toner particles. The temperature is in the range of, approximately, 150° F. to 220° F., and the time is in the range of, approximately, 3 to 60 minutes. The holder typically includes a paper tube which forms part of the finished chalk. Typically, the temperature is in the range of 180° F. to 185° F., and the time is in the range of 7 to 11 minutes. For harder chalks higher temperatures and shorter times are used. For softer chalks, lower temperature and longer times are used. The chalk produces a permanent image on a medium, such as paper, by fixing the toner chalk on the medium by only the application of heat.

16 Claims, 1 Drawing Sheet

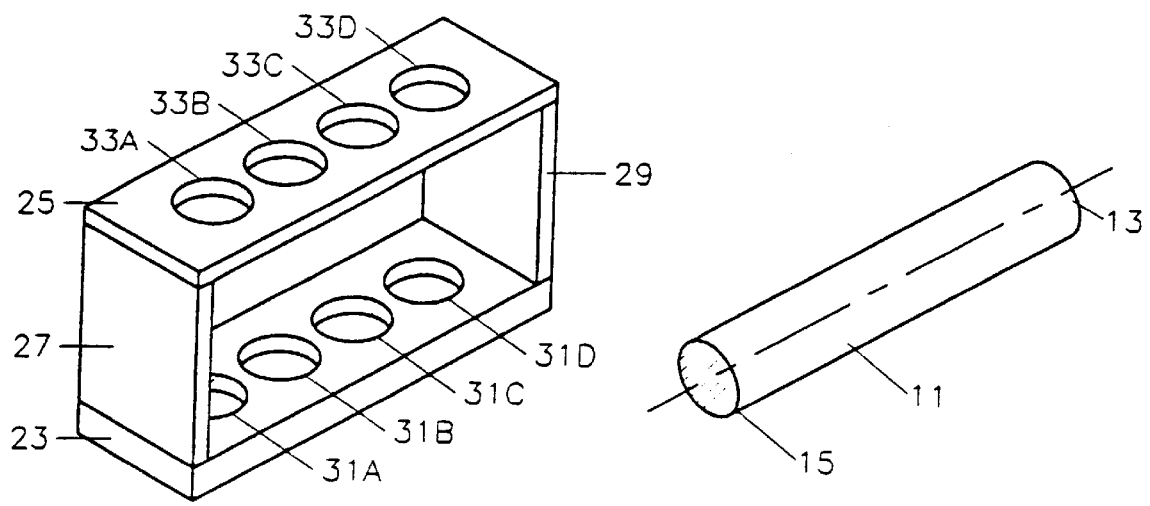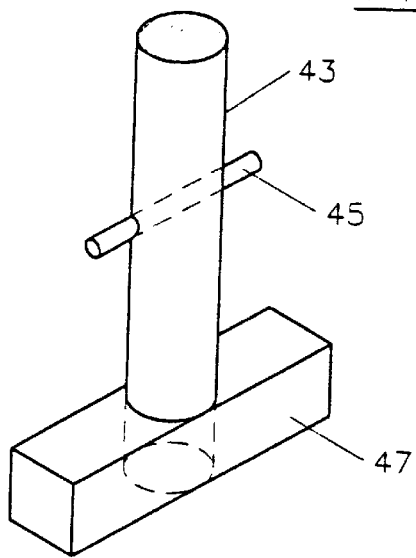

ARTIST'S MARKING MATERIAL

FIELD OF THE INVENTION

The present invention relates to material used by artists for marking surfaces, particularly in the process of drawing. The present invention is a new artists' chalk or pencil formed of dry, sintered copier toner, either new or waste. The chalk, as defined herein, can be used for traditional drawing. It can also be used for marking lithography plates, and marking plates used in etchings.

BACKGROUND OF THE INVENTION

Vine charcoal and compressed charcoal are traditional materials used for sketching on paper. Vine charcoal is never wrapped; compressed charcoal is sometimes wrapped in paper. Historically, figure drawings and landscape drawings were most frequently done with these materials. Today's artists use these materials for many different purposes on a large variety of surfaces. However, one aspect of the use of charcoal remains the same, namely the lack of permanence. Historically, charcoal drawings were not meant to be permanent. In many cases they were sketches (of, for instance, a scene or person in a fresco) which were thrown away when the fresco was completed. The concept of archiving charcoal drawings is not believed to have started until the 19th century. To date, there has never been a good solution to archiving. Spray fixatives (aerosol glues) have been the only option. These sprays are toxic; the associated air pressure blows some of the charcoal particles off the paper.

Charge responsive dye or pigments colorata, known as toner, are binder-coated pigment or colorstuff dispersed in a solvent or vehicle which includes trace amounts of a charge control or directing agent. A wide variety of pigments and/or dyestuffs are suitable for use in toners, including various carbon blacks, asphaltums, various oxides, sulfates, sulfides, carbonates, phosphides, phosphates, nitrates, nitrites, alkali metals, alkaline earth metals, and numerous organic derivatives of inorganic pigments. There is also a variety of proprietary colorants available, including, but not limited to, Phthalocyanine Blue, Phodamine B, and Benzidine Yellow. A wide variety of resinous or plastic binders are also used in toners, including various vinyl resins, regular and modified acrylic resin polymers, methacrylates, regular and modified alkyl resin types, vinyl acetate polymers, vinyl butryal polymers, styrene acrylates and polyester resins. A number of control agents are used, including colbalt naphthanate, manganese octosol, linseed oil, asphaltum, and ollyl acid phosphate. Toner solvents include a variety of inert, highly dielectric, paraffinic oleaginous materials such as denatured alcohol, acetone, wintergreen and Hancolite.

The use of used copier toner for tusche washes is disclosed in Superior Tusche Washes Using Dry Copier Toners; N. Semenoff, Leonardo, Journal of the International Society for the Arts Sciences and Technology; vol. 20, No. 1, pp. 71–77, 1987. In this article lithographic tusche washes made using dry copier toners are disclosed. Semenoff divides toners into 3 classes as follows:

Class A are those toners which are not affected by ordinary petroleum solvents and can be used in these solvents for washes over gum masks. Class B toners are the most appropriate for my work because many of my washes use a water medium. The big advantage in using Class B toners is that they can be set easily by such common solvents as camp fuel. Class C toners contain magnetic oxides and are of no use in this technique.

To make the tusche washes, the dry toner is first mixed with water. Sometimes a wetting agent is used. After mixing, the toner tusches are applied to a lithographic metal plate in the same manner as grease based tusches (e.g., with brush, puddling techniques or an air brush). The image produced by the toner tusche wash can be manipulated while wet. After the water (or other solvent) has evaporated, the dry powder on the plate can be further manipulated. The toner image can then be set by a variety of methods: (1) a heater such as an etcher's heating plate (care being taken not to warp the thin lithography plate); (2) using the vapors of the laquer thinner and acetone to soften the toner particles sufficiently so that they adhere to the plate surface; (3) flowing solvent (such as camp fuel or turpentine) over the dry powder without disturbing the particles; and (4) use of an air brush to wet the toner with a sufficient amount of solvent. The "Wick Solvent Method" (No. 3, above) is preferred by the author as the solvent flows gently over the image to set it. The toner reacts quickly with the solvent. After setting the plate is etched. The method also works on stone. Finally, the author notes that:

Although toners in the image can be used as a printing base, they are not adequately bonded to the plate surface on setting the image. For this reason, I prefer to replace toner with the superior base-forming vinyl lacquer, or to do a partial washout with turpentine to produce a properly bonded image.

Semenoff has also made, on a non-commercial basis, sticks of used toner for use in lithography only. These sticks are made by compressing toner powder under high pressure. The details of the process are not otherwise known to the inventors. Seminoffs compressed toner comes in a block of four. For an artist to use this material he/she must break one piece off the whole block, not unlike that of breaking a piece off a KitKat® bar. These blocks are heavy, densely compact and quite brittle. These characteristics result in damage in shipping, from dropping, or from just simple use (breaking one stick off the block without damaging it or the others is quite a challenge).

Aside from the washes and compressed pieces of toner described above, in the fields of drawing, making lithography plates and making plates used for etchings, no other use of copier toner is known to the inventors.

In use in xerography, toners tend to become depleted of one or more of their essential components with relatively short use. The usual treatment of this depleted mixture is for the user to discard it as waste. In search of a solution to this problem, various methods of processing waste toner are disclosed in the prior art. U.S. Pat. No. 3,924,566, issued to Dennie, discloses the reclamation of waste toner by solidifying it through heat within plastic bottles located within the copy machine. Also using heat to melt the toner, for solidification and disposal, is disclosed U.S. Pat. No. 5,136,338, issued to Greenaway et al. This latter patent describes a system to collect waste particles on a heated rotating drum, scraping the melted toner onto a second rotating drum, and collecting the toner, after cooling for disposal. Other methods involve separation procedures, such as disclosed U.S. Pat. No. 4,052,298, issued to Bradley. This patent utilizes solution and selective extraction to isolate the particular components of the toner for reuse.

Other than recycling separated component parts for reuse, none of these patents teach or suggest any use for the waste toner after treatment, other than throwing it away. Furthermore, none of the above-referenced patents anticipate producing the solid waste in a form which can be used to mark surfaces, as the multiple heat exposures, temperatures (i.e., the 250° F. of Greenaway et al.), and time employed results in completely hardened material which cannot be used to mark a surface. Indeed, Greenaway et al. comments that the melted toner is "as inert as any other solid block of plastic material." See col. 6, line 23. Finally, the material is in a form which is inconvenient for marking, as it is located inside a waste container, or scraped off a heating drum in lumps.

The present invention differs from the prior art in providing an artists' marking material made from waste toner, a method of forming the artist's material into a solid state or chalk, and devices used to produce the artist's marking material. Alternately, the marking material can be made from new toner. The produced material is versatile. Primarily it is used for traditional drawings. However, it can also be used for the marking of plates used in lithography and etching. The produced image is easily fixed, with heat in the range of 200–250° F., thus avoiding the problems associated with the fixative spray products now used by artists when sealing a charcoal drawing. The material of the present invention has the highly advantageous characteristic of being fixed to any heat-resistant surface through exposure to relatively low temperatures for short periods of time. This characteristic allows the material of the present invention to be easily adapted for use in multiple artistic methods including, but not limited to, drawing, lithography, and etching.

SUMMARY OF THE INVENTION

The present invention is directed to a method of production an artists chalk from dry copier toner. The method comprises the steps of (1) providing a toner holder having cavity for holding the toner, wherein the cavity has a shape which, at least approximately, defines the shape of the chalk; and heating the toner at a temperature high enough and for a period long enough to sinter the toner into the chalk. Pressure, beyond ambient, is not applied to the toner during the manufacturing process. The temperature is in the range of, approximately, 150° F. to 220° F., and the time is in the range of, approximately, 3 to 60 minutes. The holder typically includes a paper tube which forms part of the chalk. Other materials, such as wood, plastic or cardboard, can be used.

Preferably the temperature is in the range of 180° F. to 185° F., and the time is in the range of 7 to 11 minutes. For harder chalks higher temperatures and shorter times are used. Conversely, for softer chalks, lower temperatures and longer heating times are used. For a harder chalk the temperature may be in the range of 193° F. to 197° F. and the time in the range of 4 minutes to 5 minutes. For a softer chalk, the temperature may be in the range of 155° F. to 165° F. and the time in the range of 25 minutes to 35 minutes.

The invention also includes an artists chalk made by the above described method.

Finally, the present invention includes a dry method of producing an image on a medium such as paper. The method includes the steps of: (a) providing a chalk made of sintered toner; (b) marking on the medium with the toner chalk to produce an image; and (c) fixing the toner chalk on the medium by only the application of heat. The toner is fixed at a temperature of, approximately, between 200° F. and 250° F., for a time of at least 1 minute.

BRIEF DESCRIPTION OF THE DRAWINGS

The present invention can be better understood with reference to the following drawings.

FIG. 1 is a perspective view of a paper tube used in forming the chalks of the present invention;

FIG. 2 is a perspective view of a rack suitable for holding the tubes of FIG. 1 during the sintering process; and FIG. 3 is an alternate apparatus for holding tubes of the type illustrated in FIG. 1.

DETAILED DESCRIPTION OF THE PREFERRED EMBODIMENTS

The present invention involves an artist's marking material or chalk produced from copier toner, methods of producing such marking material, and methods for fixing such marking material used to produce a permanent image. New or waste toner from any manufacturer can be used, and black or colored toner works equally well. In the case of colored toner, only new material works, because copiers mix waste toner into one container creating a gray/green color. Colored toner can be mixed prior to the processing, described below, to create custom colors for the final chalk product.

The preferred method of forming the chalk or pencil is described in connection with FIGS. 1 and 2. FIG. 1 illustrates a tube 11 made out of any inert paper, such as craft paper, rag paper, rice paper or newsprint. Paper tube 11 is folded closed at one end 13 and is open at the other end 15 to receive loose toner. Paper tube 11 is placed upright, in tube support 21, illustrated in FIG. 2, which includes bottom plate 23, top late 25 and side, spacer plates 27 and 29. Plate 23 has a series of closed end cylindrical openings 31A–31D. Plate 25 has a like series of through openings 33A–33D, in alignment with holes 31A–31D. Plate 25 is spaced from plate 23 such that the distance between the top surface thereof and the bottom of openings 31A–31D is no greater than the length of tube 11. Tube support 21 can be made from a variety of materials including wood, aluminum, steel, copper and ceramics, that can withstand the temperature of the oven. The tube support 21 can be placed on a vibrating jig (not shown) to ensure that the toner falls to the bottom of the paper tube and that there are no spaces or voids in the material. However, the toner is not otherwise compacted, and it is not compressed.

The filled tubes, supported in one or more racks 21 are then placed into a conventional oven (not shown) and sintered. The sintering process of the present invention involves bringing the powdered toner to a temperature between, preferably, approximately 160° F. and 210° F. for a period of time of, preferably, approximately 3 minutes to 30 minutes. The higher the temperature, the shorter the time; the lower the temperature, the longer the time. The exact time and temperature the toner is heated to is determined by the level of hardness desired in the chalk. A temperature of 150° F. will produce a very soft chalk. A temperature of 120° F. will not work. At the other extreme, temperatures above 220° F. produce a material which is too hard and brittle. The table below (wherein m=minutes and s=seconds) sets forth examples which are believed to be representative of the process. Only two tubes of toner were sintered for each test. The toner material was, primarily, polystyrene.

| Time | Temp | Results/Observations |
|---|---|---|
| 60 m | 150° F. 62° C. | Sintering occurred but only mildly; stick crushed readily into powder no chunks or nodules at all. |

-continued

| Time | Temp | Results/Observations |
| --- | --- | --- |
| 30 m | 160° F. 71° C. | Stick totally sintered; draws well; doesn't crumble at all. Very soft stick; makes a very rich dark line; excellent quality if soft stick desired. |
| 10 m 15 s | 180–185° F. 86° C. | No noticeable difference from 9 m 45 s; this batch feels ok too. |
| 10 m | 180–185° F. 86° C. | No noticeable difference from 9 m 45 s. |
| 9 m 45 s | 180–185° F. 86° C. | Shiny spots on ends; this batch feels just right. |
| 9 m 30 s | 180–185° F. 86° C. | For some reason these two are a little harder than normal; still work fine; some small shiny spots seen on ends. |
| 9 m 15 s | 180–185° F. 86° C. | Softer than usual, but not dramatically; work well. |
| 7 m | 183° F. | High temperature sintering is uneven; time more critical. |
| 5 m | 193–197° F. 94° C. | Actually cooked slightly higher at 194–198° F.; slight shiny spotting on ends; some minor hard spots, otherwise draws nice and even; perhaps hard spots could be eliminated with shorter bake time. |
| 4 m 30 s | 193–197° F. 94° C. | Draws nice and rich perhaps even a little too soft; draws good; dark lines. |
| 4 m | 193–197° F. 94° C. | This batch crumbly on ends before use; crumbles upon use. |
| 3 m | 193–197° F. 94° C. | Powder; not nearly enough sintering for a cohesive stick. |
| 4 m 30 s | 210–217° F. 102° C. | Shrinkage such that one can see all the way through one stick from top to bottom; some shiny spots as before. Almost too hard to draw with at all; crumbles when hollow at core. No good. |
| 3 m 30 s | 210–217° F. 102° C. | Shrinkage in center of sticks at top on both pieces as well as "bubbles" at bottom; some shiny spots as well. Draws fairly well, slight hardness but not too much; has above average crumbling with normal pressure. |
| 2 m | 210–217° F. 102° C. | Powder; not enough sintering for cohesive stick. Some harness throughout center of tube from top to bottom. |
| 3 m 30 s | 220–230° F. 105° C. | Solid stick; both samples have hollow shiny spots on ends. Stick draws, though it is hard; crumbling is occurring due to hollowness. |
| 2 m 30 s | 220–230° F. 108° C. | Cohesion is achieved though stick is still somewhat crumbly; massive shrinkage. |
| below 2 m 30 s | 220–230° F. 108° C. | Powder; no cohesion of stick at all, massive shrinkage from center already visible. |

It is not feasible to sinter toner into a usable chalk at temperatures above 220° F. This is true if one is sintering in a thin walled paper tube or with a formed unshielded stick. It may be possible that a thick walled aluminum jacket could allow for higher oven temperatures. It would be doing so, however, by absorbing heat and lowering the actual temperature reaching the toner. The other result of using a thick jacket would be to increase sintering time.

Best results are obtained where the tube support 21 has minimal contact with tube 11, as alteration in the heat distribution during sintering cause by contact with support 21 causes weak points in the final chalk product. Variations of structures reminiscent of test tube racks have been relatively successful in performing the support function. Some contact between the tube and the support structure is avoided by having the top of tube 11 level with the upper surface of plate 25. If contact cannot be avoided, one or both ends of the tube which touched support 21 during sintering can be sliced off before sale to the consumer. The waste ends can be reground and recycled in the production of other chalk.

An alternate embodiment to avoid the heat distribution problem is illustrated in FIG. 3. Support 41 includes support tube 43, made of metal (or other material which won't burn or degrade at the temperature used for sintering) which has a retaining pin 45 running through its diameter. Support tube 43 is maintained in an upright position using base 47, also made of metal. This embodiment does not attempt to provide minimal contact with tube 11, but consistent contact over the surface of the tube and toner. To achieve this, the position of retaining pin 45 in tube 43 is such that the top of tube 11, when inserted into the metal support tube 43, will be approximately even with the top of the support tube 43. The folded bottom 13 of tube 11 rests on retaining pin 45. By surrounding the tube 11 with metal, the sintering process could be altered, but it is altered in a consistent way throughout the formation of the chalk, thus avoiding the weak spot problem. Tubes made of screen, or perforated metal are also contemplated to form support 41.

In the above described process racks 21 are inserted in an oven for the time and temperature required for a chalk of a particular hardness. When the process is complete, the oven is opened, the rack(s) are removed, other racks with tubes 11 with unsintered toner inside are inserted, and the oven again closed. The process of opening and closing is done quickly, resulting in only a slight drop in the oven temperature, typically, just a few degrees.

For making colored chalk, the above described process works equally well for both new and used toner. However, for making colors, other than black and other than the color created incidentally by the combining of color waste in a copy machine, new toner must be used. The times and temperatures remain as indicated above.

The chalk remains in tube 11 when it is sold to the consumer. Advantages of tube 11 includes the increased tensile strength of the supported chalk, protection of the chalk during use, protection of the user, unintended marking of other surfaces by the chalk during use, and the provision of a surface upon which to place trademarks and patent/patent pending notices. Paper tube 11 is gradually ripped off by the user to expose new chalk surface for marking.

Toner pencils are made in a similar fashion to the chalks described above. Specifically, the toner is placed directly into the object that will form the outside of the pencil. This will be a tube, in whatever diameter and length desired, which may be composed of, but is not limited to the following materials: paper, plastic, cardboard or wood. The tube, with the powdered toner, is placed in an oven and heated, in the manner described above. The material (e.g., thickness and composition) comprising the pencil shell must be taken into account when determining the oven temperature and heating time to form the toner pencil.

An alternate method of forming the chalk of the present invention is by forming a thick paste from toner (either waste or new), a binder (such as corn, rice or wheat starch), and a suitable solvent (such as denatured alcohol). The percentage of binder is, preferably, in the range of 5 to 20%. A toner to binder ratio of 50:50 also works though it washes out/dilutes the color of the toner as the binder is generally a white. Thus, black toner mixed 50:50 with a whitish binder produces a grey colored chalk. The paste must be left to dry, until the denatured alcohol completely evaporates, before it can be sintered.

The chalk or pencil thus formed can be used in a variety of artistic processes. It may be applied to paper in the same manner as charcoal. Afterwards, the chalk can be fixed to any surface which will withstand being heated to approximately 200–250° F. for a period between, typically, 1 to 5 minutes, until the toner markings are completely fixed. For stone, the heating may need to be considerably longer. Between 300–350° F. the toner degrades. Above 400° F., mediums such as paper burn.

The present invention can be produced in any color and is permanently fixed to any surface through heat, a nonchemical, non-polluting process. Heating can be accomplished with, for example, a heat gun, in an oven, with an iron, with a heating plate, etc. The drawings made with the present invention are permanent and nonsmudging after the fixation process. Drawings may also be fixed as many times as desired so that multiple colors can be both blended and overlapped in the same drawing. The use of additional supplies, such as spray fixative, is avoided.

The most popular application of the present invention will be in traditional drawing and sketching. In lithography, the marks which form the image must currently be made using a grease based product. This not only limited the type of mark which can be made, but also makes it difficult to remove or alter a mark on the plate once it is made. The present invention creates marks suitable for use on lithographic plates which is nongreasy, and closely resembles vine charcoal or a lead pencil, depending on the hardness of the product. Furthermore, the mark is completely removable or smugeable until fixed with heat. The only restriction is that the use of plates is preferred, rather than stones, due to the time to heat the entire stone in the fixation process. The artist marking material of the present invention is also useful in the etching process. It can be used on either copper or zinc or other metal plates, and once it is fixed using heat, becomes an acid resist. The chalk can be used to draw lines, which will become paper (negative) areas in the an intaglio. The chalk may also be crumbed to powder and used to replace rosin in the aquatint process.

It is understood that the invention is not limited to the specific embodiments shown and described, but changes or modifications can be made in the embodiments without departing from the contemplated scope of the present invention. All such changes are apparent to one of ordinary skill in the art and all such changes and modifications are intended to be within the scope of the following claims. All reference or patents discussed in this specification are hereby incorporated by reference.

What is claimed is:

1. A method of producing an artists chalk from dry copier toner, said method comprising the steps of:
   (a) providing a means, including a cavity, for holding said toner, said cavity having a shape which, at least approximately, defines the shape of said chalk; and
   (b) heating said toner at a temperature high enough and for a period long enough to sinter said toner into said chalk.

2. The method as set forth in claim 1, wherein said temperature is in the range of, approximately, 150° F. to 220° F.

3. The method as set forth in claim 2, wherein said time is in the range of, approximately, 3 to 60 minutes.

4. The method as set forth in claim 1, wherein said means for holding includes a paper tube which forms part of said chalk.

5. The method as set forth in claim 4, wherein said temperature is in the range of 180° F. to 185° F.

6. The method as set forth in claim 5, wherein said time is in the range of 7 to 11 minutes.

7. The method as set forth in claim 4, wherein said temperature is in the range of 193° F. to 197° F. and said time is in the range of 4 minutes to 5 minutes.

8. The method as set forth in claim 4, wherein said temperature is in the range of 155° F. to 165° F. and said time is in the range or 25 minutes to 35 minutes.

9. An artists chalk made by the method of claim 1.

10. An artists chalk made by the method of claim 3.

11. An artists chalk made by the method of claim 6.

12. A method of producing an artists chalk from dry copier toner, said method consisting essentially of the steps of:
   (a) providing a means, including a cavity, for holding said toner, said cavity having a shape which, at least approximately, defines the shape of said chalk; and
   (b) heating said toner to a temperature high enough and for a period long enough to sinter said toner into a solid suitable for marking on a substitute such as paper.

13. A dry method of producing an image on a medium such as paper, said method including the steps of:
   (a) providing a chalk made of sintered toner;
   (b) marking on said medium with said toner chalk to produce an image; and
   (c) fixing said toner chalk on said medium by only the application of heat.

14. The method as set forth in claim 13, wherein said toner is fixed at a temperature of, approximately, between 200–250° F.

15. The method as set forth in claim 14, wherein said toner is fixed for a time of at least 1 minute.

16. A method of producing an image on a medium such as paper, said method consisting of:
   (a) providing a chalk mode of sintered toner;
   (b) marking on said medium with said toner-chalk to produce an image; and
   (c) fixing said toner chalk on said medium by only the application of heat.

* * * * *